United States Patent [19]

Niebauer et al.

[11] Patent Number: 5,088,862
[45] Date of Patent: * Feb. 18, 1992

[54] CUTTING INSERT WITH CHIP CONTROL

[75] Inventors: Kenneth L. Niebauer; Thomas A. Lockard, both of Raleigh, N.C.

[73] Assignee: Kennametal Inc., Latrobe, Pa.

[*] Notice: The portion of the term of this patent subsequent to May 30, 2006 has been disclaimed.

[21] Appl. No.: 582,458

[22] Filed: Sep. 13, 1990

Related U.S. Application Data

[60] Continuation of Ser. No. 329,146, Mar. 27, 1989, Pat. No. 4,963,060, which is a division of Ser. No. 93,348, Sep. 4, 1987, Pat. No. 4,834,592.

[51] Int. Cl.$^5$ .............................................. B23P 15/28
[52] U.S. Cl. .................................... 407/114; 407/116; 407/120
[58] Field of Search ............... 407/100, 107, 114, 115, 407/116, 117, 118, 120

[56] References Cited

U.S. PATENT DOCUMENTS

| | | | |
|---|---|---|---|
| 2,679,679 | 6/1954 | Metzler | 29/95 |
| 3,399,442 | 9/1968 | Jones et al. | 29/95 |
| 3,557,416 | 1/1971 | Jones | 29/95 |
| 3,754,309 | 8/1973 | Jones et al. | 29/96 R |
| 3,762,005 | 10/1973 | Erkfritz | 29/95 R |
| 3,940,835 | 3/1976 | Friedline et al. | 29/105 R |
| 4,011,050 | 3/1977 | Zinner | 407/117 |
| 4,116,576 | 9/1978 | Gawryk, Sr. | 407/114 |
| 4,340,325 | 7/1982 | Gowanlock | 407/117 |
| 4,357,123 | 11/1982 | Zweekly | 407/110 |
| 4,360,297 | 11/1982 | Weber | 407/113 |
| 4,558,974 | 12/1985 | Pano | 407/117 |
| 4,626,141 | 12/1986 | Malaker et al. | 407/114 |
| 4,778,311 | 10/1988 | Niemi | 407/117 |
| 4,834,592 | 5/1989 | Niebauer | 407/114 |
| 4,909,677 | 3/1990 | Noguchi et al. | 407/66 |
| 4,957,396 | 9/1990 | Niebauer | 407/114 |
| 4,963,060 | 10/1990 | Niebauer | 407/114 |
| 4,969,779 | 11/1990 | Barten | 407/114 |
| 4,993,893 | 2/1991 | Niebauer | 407/114 X |
| 5,032,050 | 7/1991 | Niebauer et al. | 407/114 |
| 5,037,249 | 8/1991 | Niebauer et al. | 407/114 |

FOREIGN PATENT DOCUMENTS

| | | | |
|---|---|---|---|
| 381262 | 9/1986 | Austria . | |
| 0088426 | 9/1983 | European Pat. Off. | 407/117 |
| 0112806 | 7/1984 | European Pat. Off. . | |
| 0138498 | 4/1985 | European Pat. Off. . | |
| 2238888 | 8/1975 | Fed. Rep. of Germany . | |
| 3301919 | 7/1984 | Fed. Rep. of Germany . | |
| 1127695 | 12/1984 | U.S.S.R. | 407/117 |
| 672039 | 3/1951 | United Kingdom . | |
| 1363542 | 8/1974 | United Kingdom . | |

OTHER PUBLICATIONS

Econ-O-Groove, p. 63.
Iscar, "Cut-Grip Inserts", p. 11.
Sandvik, "Coromant Metalworking Products", pp. 20-21, 116, 118-119.

*Primary Examiner*—Bruce M. Kisliuk
*Assistant Examiner*—John A. Marlott
*Attorney, Agent, or Firm*—James G. Porcelli; Thomas R. Trempus

[57] ABSTRACT

An improved cutting insert with chip control features and a method for manufacturing the same. An insert body having peripheral end wall regions, sides and first and second walls is adapted for mounting in a pocket in a holder. The insert body has cutting edges and is adaptable for engagement by a toolholder assembly. A land region extends rearwardly from the end wall region and defines a surface region of a predetermined width. A descending wall initiates in a portion of the land and terminates in a planar floor region having a forward, a rearward and opposed side edges. A back ramp extends upwardly from the planar floor rearward edge and terminates at the respective top or bottom wall. The end wall region can include at least one flat land region adjacent the land region. The flat land region defines a selectively removable portion of the end wall region and after any selective removal thereof represents no more than approximately one-third of the total width of the end wall region.

10 Claims, 4 Drawing Sheets

CUTTING INSERT WITH CHIP CONTROL

This is a continuation of copending application Ser. No. 07/329,146 filed on Mar. 27, 1989, now U.S. Pat. No. 4,963,060, which is a divisional application of Ser. No. 07/093,348, filed on Sept. 4, 1987, and issued on May 30, 1989 as U.S. Pat. No. 4,834,592.

FIELD OF THE INVENTION

The invention is directed to cutting inserts, especially metal cutting inserts with chip control.

BACKGROUND OF THE INVENTION

Cutting inserts are well known and a large percentage of them are of the throw away design. Such inserts are detachably clamped on a holder and then are discarded when they become dull or chipped. Throw away inserts are usually indexable and often are reversible so that an insert can be provided with at least two cutting edges for selective presentation to the cutting position.

The provision of two or more cutting edges on the insert makes it economical to use and is particularly important with respect to throw away inserts because of the high cost of the materials from which the inserts are produced, especially when the material is, for example, a cemented metal carbide.

The inserts must be securely and accurately held in place within an insert holder during the cutting operation. This is especially true when the inserts are employed with numerically controlled machines which depend for accuracy upon an accurately located and firmly supported insert. When the inserts are of a substantial area, it is possible to fix the insert both accurately and firmly within the pocket of a toolholder by providing the insert with a central hole and the toolholder with a pin-type clamping device. In other cases, such inserts may be held in place by a top clamp. Examples of such holders are found in U.S. Pat. Nos. 3,754,309; 3,399,442 and 3,762,005 and British Patent Specification 1,363,542.

The main object of metal machining is the shaping of the new work surface. Much attention is paid to the formation of the chip during the machining process, even though the chip is a waste product. This is because the consumption of energy occurs mainly in the formation and movement of the chip. Thus an essential feature of any metalcutting operation is effective chip control. A principal class of chips is the discontinuous chip which has the practical advantage of being easily cleared from the cutting area. While some metals and alloys generate discontinuous chips during cutting operations, many do not. It is therefore very desirable to produce discontinuous chips during a cutting operation, regardless of the metal or alloy of the workpiece.

It has been a common practice to place a mechanical chip breaking member between the insert and the clamp securing the insert to the tool in order to provide at least a degree of chip control during the cutting operation. This arrangement presents the obvious drawback of increasing the effective area necessary for metal cutting operations with a given tool.

Because chip control is an important consideration in metal cutting operations, it has been a long standing objective in the art of metal cutting to develop improved chip breaking members for use with tools as well as improved designs for the cutting inserts. One example of a cutting insert with chip breaking capabilities is the cut-grip inserts "GIP" available from ISCAR. The ISCAR insert has a land with a pair of generally parallel, elongated and elevated members which deform the metal chips as they are removed from the workpiece. Another example of a cutting insert with features designed to provide chip control is the Econ-o-grove insert manufactured by Valenite Corporation. This insert has parallel side walls extending along a continuous descending wall, floor and back wall of constant radius. Another example of a cutting insert with a chipbreaker style is commercially available from Sandvik and is characterized by a non-continuous front face which may not provide a flat finish to the cut groove in a workpiece.

It is an object of the invention to provide an insert with improved chip control characteristics.

It is yet another object of this invention to provide an improved chip control insert configured to cooperate with a clamping element of an insert toolholder.

SUMMARY OF THE INVENTION

The invention provides a cutting insert with a unique configuration that results in improved chip control. The improved cutting insert with chip control features comprises an insert body having end wall regions and sides and first and second walls substantially perpendicular to the sides. The insert body is adapted for mounting in a pocket in an holder with one end region exposed. The insert body is invertible or indexable about an axis perpendicular to the sides thereof and the insert body has cutting edges at the end wall regions, whereby in each inverted or indexed position of the insert body a respective cutting edge is presented uppermost at the same end of the insert body.

The first and second walls or seating surfaces of the insert body define therein a diagonal notch, which extends thereacross at an angle such that each notch when uppermost forms substantially the same angle with the sides of the insert.

Each of the end wall regions of the insert defines at least in part a cutting edge for presentation to a workpiece. A land region extends rearwardly from the end wall region toward the respective first or second wall and defines a surface region of a predetermined width and area. A descending wall initiates in a portion of the land and terminates in a planar floor region having a forward, a rearward and opposed side edges. The descending wall terminates at the planar floor's forward and opposed side edges and a back ramp extends upwardly from the planar floor reward edge and terminates at the respective first or second wall.

In an alternative embodiment, the land, descending walls, back ramp and planar floor define a region which can be asymmetrically disposed in the end wall region and the end wall region also includes at least one flat land region. The flat land region or the insert body end wall region preferably defines at least in part a selectively disposable portion of the end wall region. As a result, the overall width of the end wall region is reducible by the selective removal of at least a portion of the disposable portion.

BRIEF DESCRIPTION OF THE DRAWINGS

The above as well as other features and advantages of the invention will become apparent through consideration of the detailed description in connection with the several drawings in which.

DETAILED DESCRIPTION OF THE INVENTION

Figure 1:
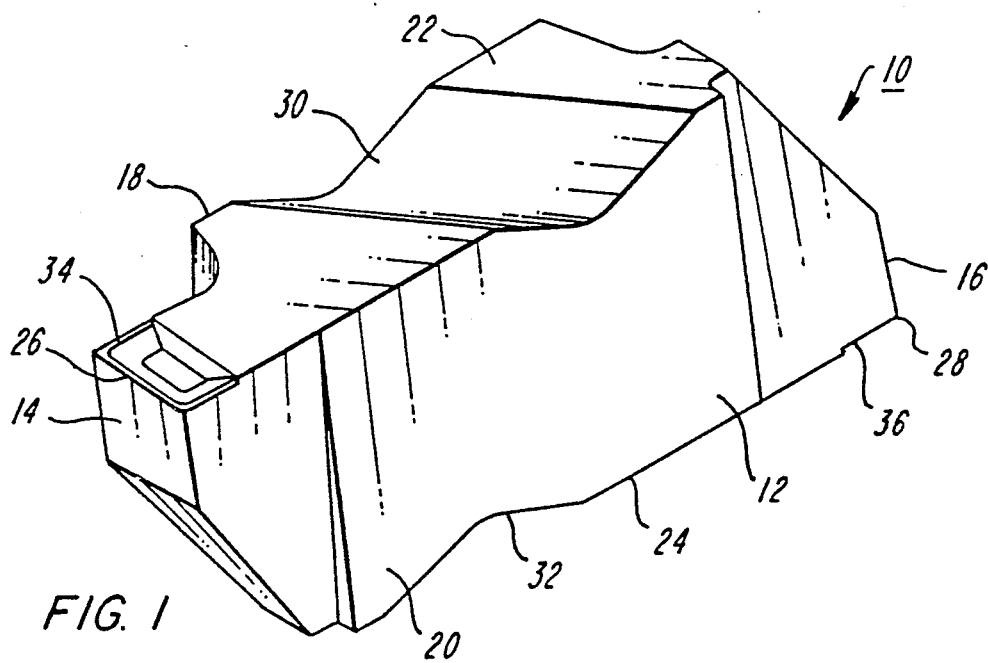
FIG. 1 is an isometric view of a cutting insert configured for chip control, all according to the present invention.

An improved cutting insert with chip control features is isometrically shown in FIG. 1 and generally indicated by the reference character 10. The insert 10 comprises an insert body 12 having a first flank or end wall 14, a second opposed flank or end wall 16, first and second sides 18 and 20 and first and second seating surfaces or walls 22 and 24. The insert body 12 is preferably made from a hard cemented carbide such as tungsten or titanium carbide or tungsten titanium carbide or TiC-TiN. At the juncture of one end part 14 and first wall 22 there is one cutting edge 26. At the juncture of the other end wall region 16 and the second wall 24 there is a second cutting edge 28.

The insert body 12 of the insert 10 is formed with a diagonal groove 30 in the first wall 22 and a diagonal groove 32 in the second wall 24 of the insert. Each groove 30 and 32 is preferably "V" shaped in cross section and adapted for engagement by the toolholder assembly which will be described below. With the insert configuration as described above, in each inverted or indexed position of the insert body 12, a respective cutting edge is presented uppermost at the same end of the insert body. The diagonal notch or grooves 30 and 32 extending across the insert body are disposed at an angle such that each notch, when uppermost, forms substantially the same angle with the sides 18 and 20 of the insert body 12. Also, in each inverted or indexed position, the insert body 12 presents an end wall region of the insert defining at least in part the cutting edge 26 or 28 to a workpiece.

Figure 3:
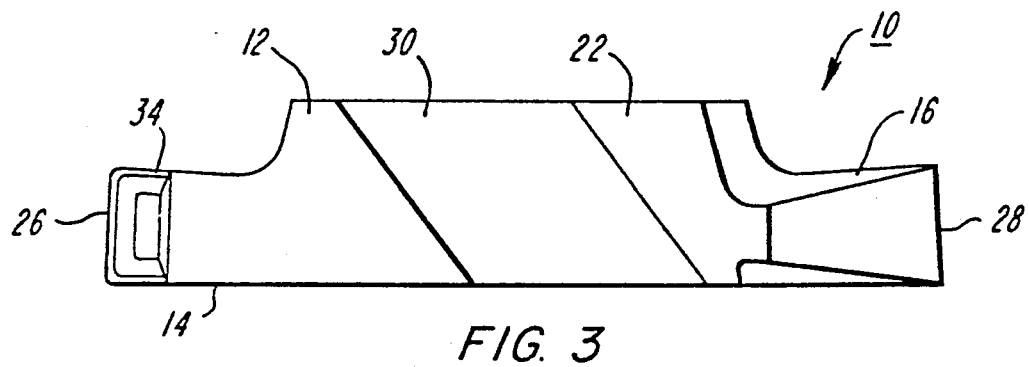
FIG. 3 is a plan view of the cutting insert of this invention.
Figure 4:
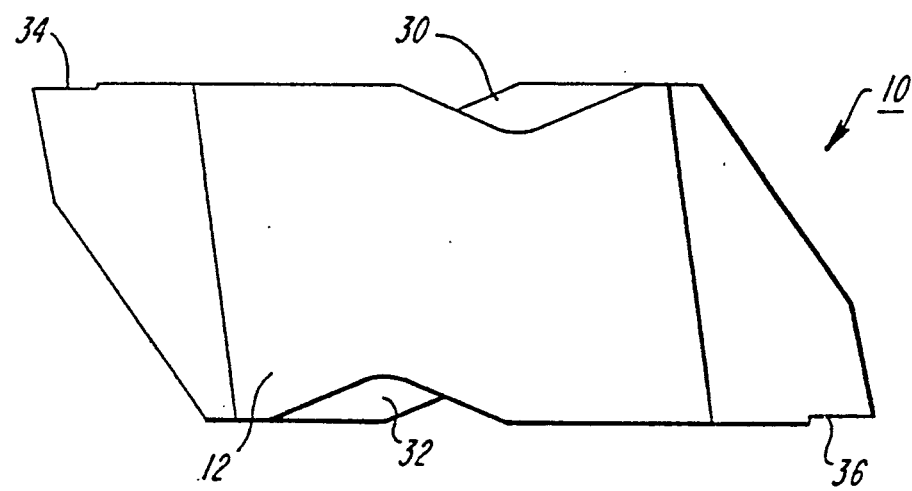
FIG. 4 is a side view of the insert of this invention.
Figure 5:
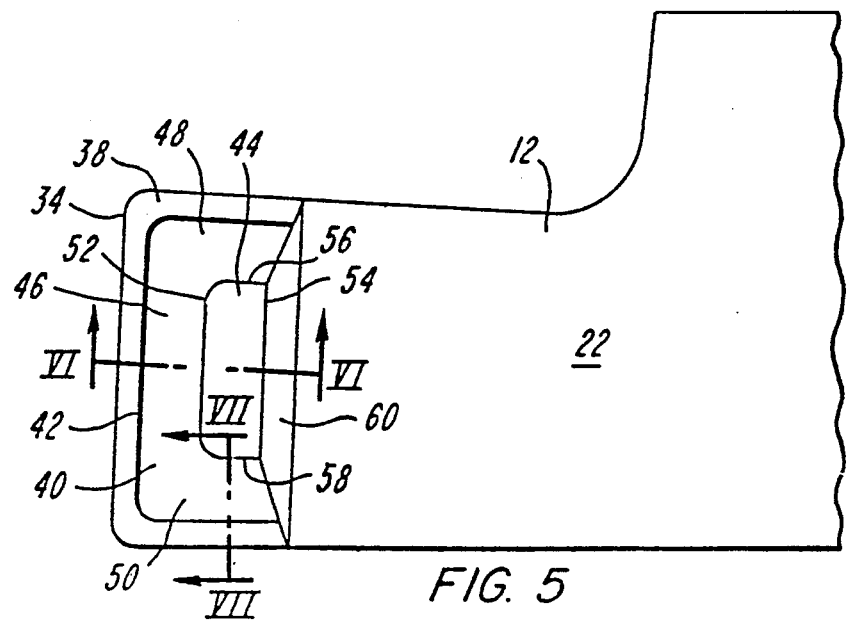
FIG. 5 is a an enlarged fragment plan view illustration the end region of the insert of FIG. 1.

As can be seen more clearly through consideration of FIGS. 3, 4 and 5, in conjunction with FIG. 1, the insert body 12 includes at each end region thereof, a land region 34 and 36 extending rearwardly from the respective end wall regions 14 and 16 toward the respective first or second wall 22 and 24. Each land region defines a surface region 38 of a predetermined width and area. It is to be appreciated that the insert 10 of this invention is reversible or indexable, and therefore the detailed features described in conjunction with one side or end region of the insert are present in the other side or end region thereof. Considering the end wall region 14, a descending wall 40 initiates in a portion 42 of the land 34 and terminates in a planar floor region 44. The descending wall 40 has a forward portion 46 and opposed side portions 48 and 50. The planar floor region 44 has a forward edge 52, a rearward edge 54 and opposed side edges 56 and 58. The descending wall 40 terminates at the planar floors forward edge 52 and opposed side edges 56 and 58. A back ramp 60 extends upwardly from the planar floor rearward edge 54 and terminates at the first wall 22.

The back ramp 60 ascends from the rearward edge 54 of the planar floor 44 toward the first wall 22 at an angle of approximately 35 to 45 degrees and, preferably, 40 degrees relative to the first wall 22.

Figure 6:
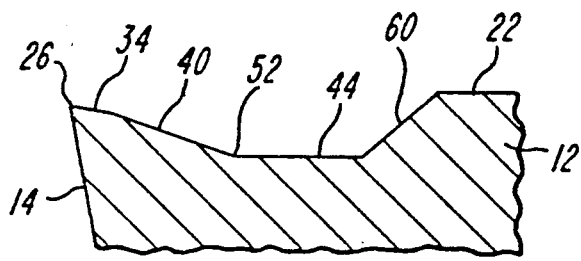
FIG. 6 is a section along lines VI—VI of FIG. 5.

As can be seen in FIG. 6, the descending wall 40 portion proximate the forward edge 52 of the planar floor 44 descends toward the floor 44 at an angle of approximately 15 to 21 degrees and, preferably, 18 degrees with respect to the planar floor 44. The land region 34 proximate the cutting edge 26 slopes downwardly toward the descending wall juncture 42 at an angle of approximately between about 5 to 15 degrees, preferably, 8 to 12 degrees, and more specifically about 10 degrees with respect to the first wall 22 of the insert body 12. The cutting edge 26 is of a lesser elevation than the first wall 22.

Figure 7:
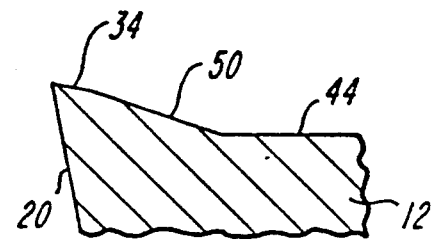
FIG. 7 is a section along lines VII—VII of FIG. 5.

As can be seen in FIG. 7, the side wall 50 of the descending wall 40, descends from the land 34 toward the planar floor 44 at an angle of between about 15 to 21 degrees and, preferably at an angle of about 18 degrees with respect to the planar floor 44. Generally the side wall has an angle with a slope selected to facilitate the pressing operation of the manufacturing process.

It has been found when cutting metal with the insert of the present invention that a chip coming off a workpiece in a light feed comes off the land area of the insert and strikes the ramp 60 wherein breakage is caused by the force of the chip's impact with either the back ramp or the chip itself as the chip is directed back toward the workpiece. In a heavier feed rate, breakage appears to be the result of a combination of the chip striking the floor 44 and the back ramp 60 as well as the chip turning back in on itself The chip coming from the workpiece forms a generally "U" shaped cross section as a result of the chip control feature of the insert 10.

While as shown in FIG. 7, the land region disposed between the side 20 and the descending side wall 48 descends toward the descending side wall 50 at a slight angle, it is believed that the lack of such a descending angle would not adversely impact chip control. However, this, descending angle is believed to contribute to a reduction in cutting forces and thus is a preferable feature.

Figure 2:
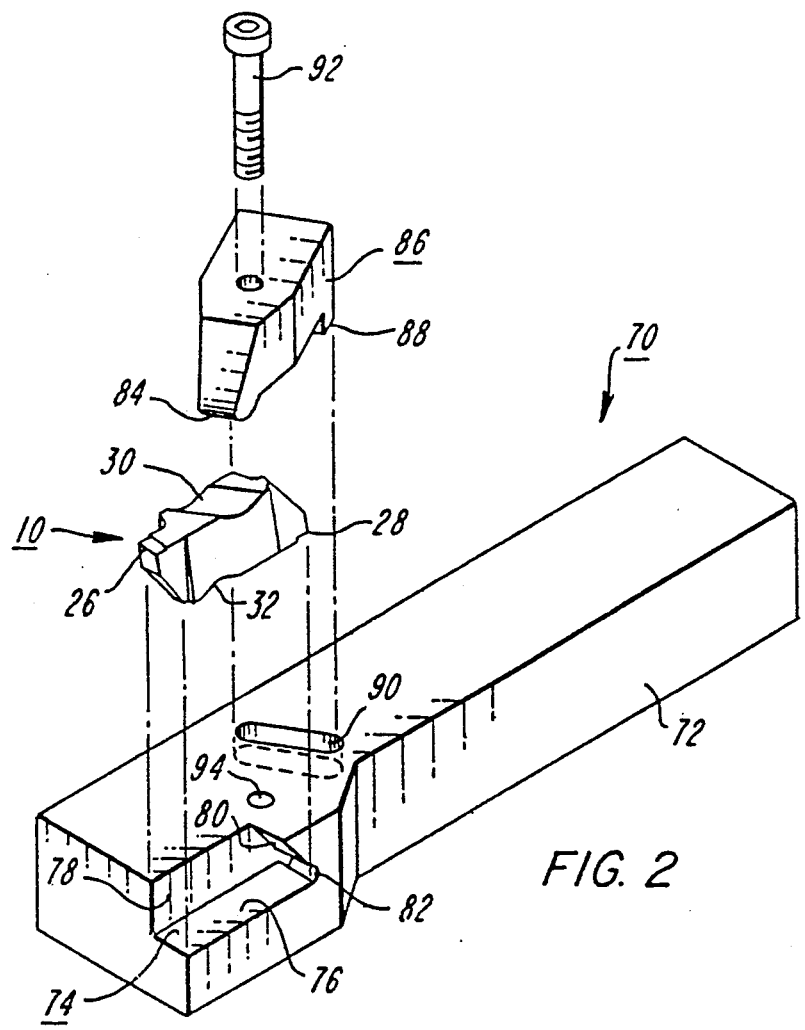
FIG. 2 is an exploded perspective view illustrating a typical holder and clamping arrangement for use in combination with the cutting insert this invention.

Turning now to FIG. 2, there is shown a toolholder 70 which is ideally suited for use in combination with the insert 10 of this invention. The toolholder 70 is in the form of a bar-like steel member 72 adapted for being clamped in a tool support of any suitable type. At one end of the member 72 there is an insert pocket 74 having a bottom wall 76, a side wall 78 and a back wall 80. Advantageously, an undercut is provided at the juncture of the bottom and back walls as indicated at 82 in order to protect the cutting edge 26, 28 of the insert 10 which is disposed in that region in each clamped position of the insert 10.

It will be noted that bottom and side walls 76 and 78 of the pocket are at right angles to each other whereas back wall 80 may be at a right angle to side wall 78 but converges with bottom wall 76 in the direction toward the back of the pocket. This pocket 74 is adapted for receiving an insert 10 therein. As described above, the insert 10 is provided with "V" shaped notches or grooves 30 and 32. These grooves 30 and 32 are adapted for engagement by the rounded nose 84 on the one end of one leg of a clamp member 86 which is in the form of an inverted "U" shaped member.

Clamping member 86 has a further leg 88 adapted for being received in a recess 90 formed in the top of the holder 70. A clamp screw 92 extends through a hole in the clamp member 86 between the legs thereof and into a threaded hole 94 provided in the top wall of the holder.

When the insert is placed in the pocket, the clamp member is put in position, and screw 92 is tightened up, and the insert is pressed firmly against the bottom wall 76 of the pocket while simultaneously being drawn toward walls 78 and 80. The insert is thus fixedly clamped in the pocket in the holder and is accurately located therein by being forced against the side walls of the pocket.

The side wall 78 of the pocket is preferably at a slight angle, approximately about 3 degrees, to the longitudinal axis of the holder 70. For this reason, the opposite ends of the insert are shaped in such a manner as to compensate for the small angularity of the wall 78 to the longitudinal axis of the holder 70.

A more detailed description of this as well as several other clamping arrangements and toolholders which can be advantageously utilized with the subject cutting insert can be had through a review of U.S. Pat. No. 3,754,309, entitled "Cutting Insert and Clamping Arrangement Therefor," which patent is assigned to the assignee of the present invention and incorporated by reference herein.

Figure 8:
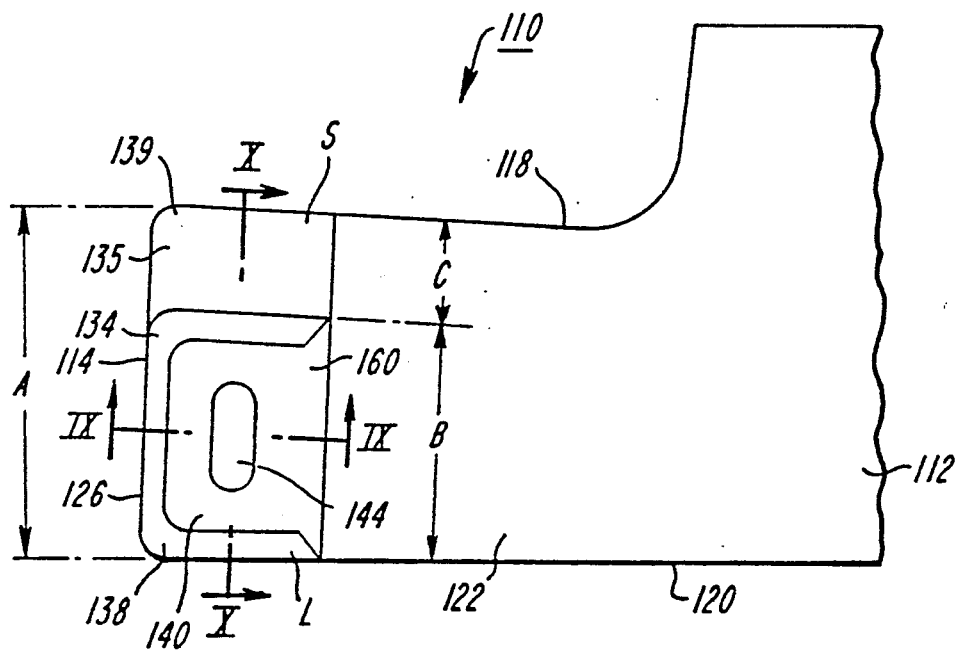
FIG. 8 is an enlarged fragment plan view illustrating the end region of an insert of this invention, which insert has an enlarged and extended land which can be selectively removed to provide inserts of a variety of sizes, all accordingly to a process of this invention.
Figure 9:
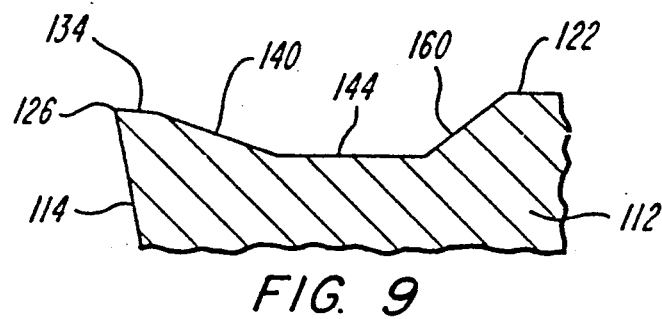
FIG. 9 is a section along lines IX—IX of FIG. 8.
Figure 10:
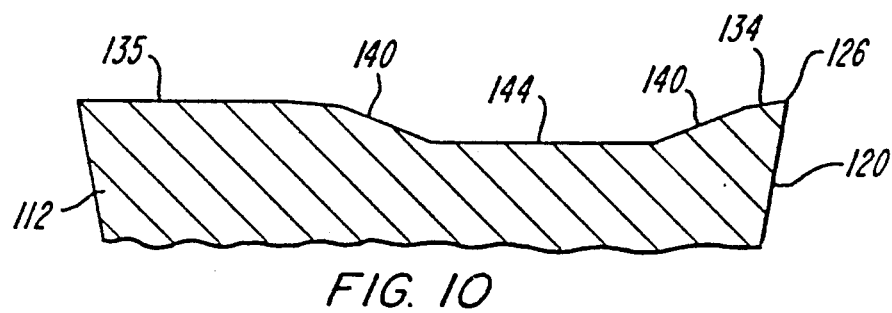
FIG. 10 is a section along lines X—X of FIG. 8.

Turning to FIGS. 8, 9 and 10, there is shown in FIG. 8 an enlarged fragment plan view illustrating the end region of an insert generally indicated by the reference character 110 which has an enlarged and extended land which can be selectively removed to provide inserts of a variety of sizes, all accordingly to a process of this invention. The insert 110 has an enlarged and extended land which can be selectively removed to provide inserts of a variety of sizes. In all other respects, the insert 110 has the same features as the insert 10, and therefore these features will not be set forth again in detail, but reference is invited to that portion of the specification which describes the insert 10. The insert body 112 of the insert 110 has a land 134 with an extended or flat land portion 135. The insert body 110 has an end wall region 114, sides 118 and 120 and a cutting edge 126. The land region 134 extends rearwardly from the end wall region cutting edge 126 toward the top wall 122 and defines a surface region of a predetermined area 138 and 139. The area 138 of the land 134 has a descending slope which is at an angle as described in conjunction with the embodiment of the insert as shown in FIGS. 6 and 7. The area 139 of the land 135 is generally flat and defines a cutting height surface "S" while the edge of the land opposite the area 139, adjacent the insert side 120, defines a cutting height line "L". The features of the descending wall 140, the planar floor 144 and the back ramp 160 are substantially similar to the wall 40, the planar floor 44 and the back ramp 60, which are described elsewhere herein.

As can be seen in FIG. 8, the land area 138 and land area 139 combine to define an overall width "A" of the end region 114. The land area 138 represents approximately two-thirds of the overall width as indicated at "B" while the land area 139 represents approximately one-third of the width of the end region as indicated at "C". Preferably, the flat land region 139 is no more than one-third of the total width of the end region of the insert after the grinding process which produces an insert with the desired final dimension. If the flat-land region 139 is larger than this preferred ratio, then during cutting operations the chip may not be adequately deformed and the advantages of the improved chip breaking feature of this invention not fully exploited. In this embodiment, the flat land 135 defines, in part, a selectively disposable portion of the end wall region 114 of the insert body 112.

Figure 11:
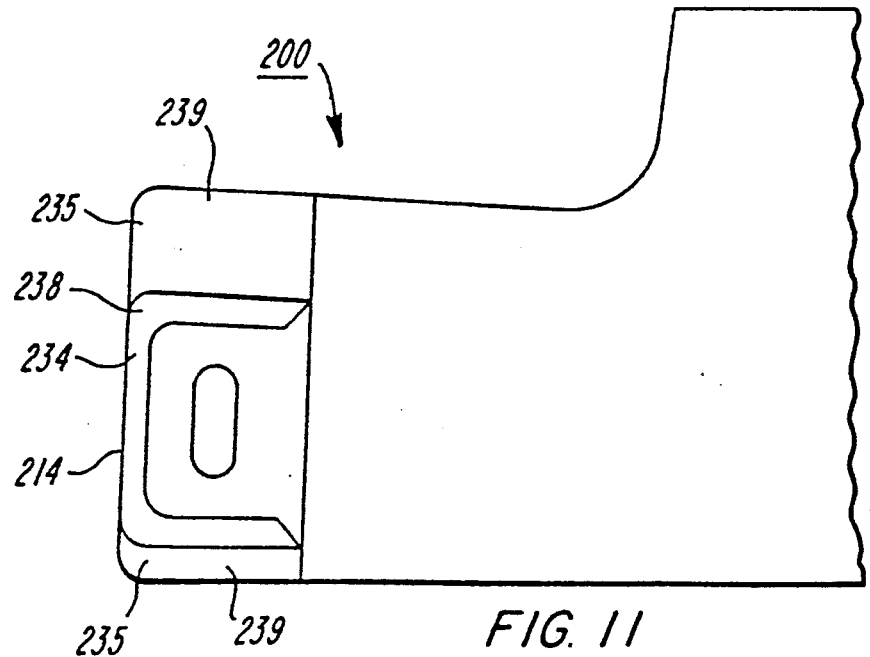
FIG. 11 is an enlarged fragment plan view illustrating the end region of an alternative embodiment of the insert of this invention, which insert has an asymmetrically disposed land in combination with an enlarged and extended flat land which can be selectively removed to provide inserts of a variety of sizes, all accordingly to a process of this invention.

While the land region 134 is shown in FIG. 8 to be located adjacent the cutting height line L, it is to be appreciated that the land 134, and associated descending wall, floor and back ramp can be disposed in a more central location or adjacent the opposite side 118 of the insert body 112. As illustrated in FIG. 11, an insert 200 includes a land 234 which is more centrally disposed in the end wall region 214 of the insert body 212. Accordingly, the flat-land region 235 now comprises two separate regions on opposite sides of the land 234, with either one or both of the separate regions being modified through grinding operations during manufacture. In a configuration in which the land area 234 is disposed in the end region 214, the ratio of the width of land area 238 to the total width of the combined land areas 239 is preferably maintained as described above, so that the combined width of the two separate flat land regions 239 in the fully manufactured cutting insert 200 of this invention represents no more than approximately one-third of the width of the end region 214. The remaining portion or approximately two-thirds of the end wall region consists of the land 234.

It has been found that a portion of the at least one flat land region can be selectively removed by grinding whereby the overall width of the cutting edge is selectively reduced to a predetermined dimension. This extended width land area comprising the land and the flat land regions of the insert body as shown in FIGS. 8 and 11, permits the manufacture of a lesser number of unique individual insert sizes and the selective grinding of a portion of the flat land regions in order to achieve the desired dimensions for a particular insert style. As a result, fewer dies are necessary to manufacture a greater number of inserts having differing dimensions.

It has been found that a metal cutting insert incorporating the chip control features described herein provides significantly improved chip control over a wide variety of metalcutting conditions. Additionally, the new insert configuration facilitates the manufacturing process. What has been described is an improved cutting insert with chip control features.

What is claimed is:

1. An improved cutting insert with chip control features for grooving applications comprising an insert body having peripheral end wall regions having a predetermined width and defining in part a cutting edge and sides with first and second walls generally perpendicular to said sides, aid insert body being indexable about an axis perpendicular to said sides thereof, said insert body having cutting edges at said end wall regions, whereby in each indexed position of said insert body a respective cutting edge is presented uppermost at the same end of said insert body, said insert body adapted for engagement by a toolholder assembly; a land region extending rearwardly and generally parallel to the respective first or second wall from each said end wall region cutting edge and defining a surface region of a predetermined width; a descending wall having a forward portion and opposed side portions, initiating in a portion of said land and terminating in a planer floor region having a forward, a rearward and opposed side edges and wherein said descending wall terminates at said planer floor's forward and opposed side edges; and a back ramp extending upwardly from said planer floor rearward edge, intersecting said descending wall opposed side portions and terminating at said respective first or second wall.

2. The improved cutting insert according to claim 1 wherein the backramp ascends from the rearward edge of the floor towards the respective first or second wall at an angle of approximately between about 35 and 45 degrees relative to said respective first or second wall.

3. The improved cutting insert according to claim 2 wherein the backramp ascents from the rearward edge of the floor towards the respective first or second wall at an angle of approximately 40 degrees relative to said respective first or second wall.

4. The improved cutting insert according to claim 1 wherein the descending wall portion proximate the forward edge of the planar floor descends thereto at an angle of approximately between about 15 to 21 degrees with respect to the planar floor.

5. The improved cutting insert according to claim 4 wherein the descending wall portion proximate the forward edge of the planar floor descends thereto at an angle of approximately 18 degrees with respect to the planar floor.

6. The improved cutting insert according to claim 1 wherein the land region proximate the cutting edge slopes downwardly toward the descending wall at an angle of approximately between about 5 to 15 degrees with respect to the first wall of said insert body.

7. The improved cutting insert according to claim 6 wherein the land region proximate the cutting edge slopes downwardly toward the descending wall at an angle of approximately 10 degrees with respect to the first wall of said insert body.

8. The improved cutting insert according to claim 1 wherein the cutting edge is of a lesser elevation than the respective first or second wall.

9. In combination with a cutting tool holder adapted to retain a cutting insert therein by means of insert retaining means, a cutting insert with chip control features for grooving applications comprising an insert body having peripheral end wall regions having a predetermined width and defining in part a cutting edge and sides with first and second walls generally perpendicular to said sides, said insert body being indexable about an axis perpendicular to said sides thereof and adapted for mounting in the cutting tool holder with one end region exposed, said insert body having cutting edges at said end wall regions, such that in each indexed position of said insert body a respective cutting edge is presented uppermost at the same end of said insert body, said insert body adapted for engagement by a toolholder assembly; a land region extending rearwardly and generally parallel to the respective first or second wall from each said end wall region cutting edge toward said respective top or bottom wall and defining a surface region of a predetermined width; a descending wall having a forward portion and opposed side portions, initiating in a portion of said land and terminating in a planar floor region having a forward, a rearward and opposed side edges and wherein said descending wall terminates at said planer floor's forward and opposed side edges; and a back ramp extending upwardly from said planer floor rearward edge, intersecting said descending wall opposed side portions and terminating at said respective top or bottom wall.

10. An improved cutting insert with chip control features for grooving applications comprising an insert body having peripheral end wall regions having a predetermined width and defining in part a cutting edge and sides with first and second walls generally perpendicular to said sides, said insert body being indexable about an axis perpendicular to said sides thereof, said insert body having cutting edges at said end wall regions, whereby in each indexed position of said insert body a respective cutting edge is presented uppermost at the same end of said insert body, said top and bottom walls of said insert body defining therein a diagonal notch, said notch extending thereacross at an angle such that each notch when uppermost forms substantially the same angle with said sides of the insert, a land region extending rearwardly and generally parallel to the respective first or second wall from each said end wall region cutting edge and defining a surface region of a predetermined width; a descending wall having a forward portion and opposed side portions, initiating in a portion of said land and terminating in a planer floor region having a forward, a rearward and opposed side edges and wherein said descending wall terminates at said planer floor's forward and opposed side edges; and a back ramp extending upwardly from said planer floor rearward edge, intersecting said descending wall opposed side portions and terminating at said respective first or second wall.

* * * * *